United States Patent
Baysal

(10) Patent No.: US 11,766,050 B2
(45) Date of Patent: Sep. 26, 2023

(54) YOGURT FOR DOGS

(71) Applicant: Mesut Baysal, Mechanicsburg, PA (US)

(72) Inventor: Mesut Baysal, Mechanicsburg, PA (US)

(73) Assignee: COUNTRY FOOD, LLC, Mechanicsburg, PA (US)

( * ) Notice: Subject to any disclaimer, the term of this patent is extended or adjusted under 35 U.S.C. 154(b) by 269 days.

(21) Appl. No.: 16/018,087

(22) Filed: Jun. 26, 2018

(65) Prior Publication Data

US 2019/0387770 A1     Dec. 26, 2019

(51) Int. Cl.

| | | |
|---|---|---|
| A23K 10/18 | (2016.01) | |
| A23K 20/163 | (2016.01) | |
| A23K 20/24 | (2016.01) | |
| A23K 20/22 | (2016.01) | |
| A23K 50/42 | (2016.01) | |
| A23K 50/45 | (2016.01) | |
| A23K 50/48 | (2016.01) | |
| A23K 20/147 | (2016.01) | |

(52) U.S. Cl.
CPC ............ *A23K 10/18* (2016.05); *A23K 20/147* (2016.05); *A23K 20/163* (2016.05); *A23K 20/22* (2016.05); *A23K 20/24* (2016.05); *A23K 50/42* (2016.05); *A23K 50/45* (2016.05); *A23K 50/48* (2016.05); *A23Y 2220/03* (2013.01); *A23Y 2220/13* (2013.01); *A23Y 2220/15* (2013.01); *A23Y 2220/17* (2013.01); *A23Y 2220/23* (2013.01); *A23Y 2220/29* (2013.01); *A23Y 2220/37* (2013.01); *A23Y 2220/49* (2013.01); *A23Y 2220/63* (2013.01); *A23Y 2220/67* (2013.01); *A23Y 2220/71* (2013.01); *A23Y 2220/73* (2013.01); *A23Y 2220/79* (2013.01); *A23Y 2240/25* (2013.01); *A23Y 2240/75* (2013.01); *A23Y 2300/21* (2013.01); *A23Y 2300/25* (2013.01); *A23Y 2300/29* (2013.01); *A23Y 2300/45* (2013.01); *A23Y 2300/49* (2013.01); *A23Y 2300/55* (2013.01)

(58) Field of Classification Search
CPC .... A23K 10/18; A23K 20/147; A23K 20/163; A23K 20/22; A23K 20/24; A23K 50/42; A23K 50/45; A23K 50/48; A23Y 2220/03; A23Y 2220/13; A23Y 2220/15; A23Y 2220/17; A23Y 2220/23; A23Y 2220/29; A23Y 2220/37; A23Y 2220/49; A23Y 2220/63; A23Y 2220/67; A23Y 2220/71; A23Y 2220/73; A23Y 2220/79; A23Y 2240/25; A23Y 2240/75; A23Y 2300/21; A23Y 2300/25; A23Y 2300/29; A23Y 2300/45; A23Y 2300/49; A23Y 2300/55
USPC ...................................... 426/34, 580, 583, 2
See application file for complete search history.

(56) References Cited

U.S. PATENT DOCUMENTS

| | | |
|---|---|---|
| 4,110,476 A | 8/1978 | Rhodes |
| 4,971,810 A | 11/1990 | Hoyda |
| 5,968,569 A | 10/1999 | Cavadini |
| 6,030,650 A | 2/2000 | Kamarei |
| 8,298,604 B2 | 10/2012 | Gutknecht |
| 8,802,158 B2 | 8/2014 | Boileau |
| 8,894,991 B2 * | 11/2014 | Boileau ................. A61K 35/747 424/93.45 |
| 9,580,680 B2 * | 2/2017 | Boileau .................... A61P 3/06 |
| 2005/0158293 A1 * | 7/2005 | Boileau .................... A61P 1/12 424/93.45 |
| 2008/0260893 A1 * | 10/2008 | Giffard .................. A23C 9/206 426/2 |
| 2009/0074932 A1 | 3/2009 | Swan |
| 2013/0259975 A1 * | 10/2013 | Schaffer-Lequart .... A23L 7/115 426/28 |

OTHER PUBLICATIONS

Ripley, K., Can Dogs Eat Yogurt?, 2015, American Kennel Club, https://www.akc.org/expert-advice/nutrition/can-dogs-eat-yogurt/#:~:text=trouble%20digesting%20it.-,Is%20Yogurt%20Good%20For%20Dogs%3F,sweeteners%2C%20both%20natural%20and%20artificial.*

* cited by examiner

*Primary Examiner* — Leslie A Wong
(74) *Attorney, Agent, or Firm* — Donald J. Silvert; SILVERT IP LAW

(57) ABSTRACT

The present invention is a yogurt product that may be consumed by dogs and other mammalian pets. The yogurt product is in an unflavored form comprising as essential constituents: (A) 0% to 88% by weight water; (B) 0.2% to 25% by weight of a no-fat protein component selected from the group consisting of skim milk and cultured skim milk; (C1) 0.001% to 6% by weight sugar component comprising: (C1) 0.001% to 6% polydextrose and (C2) 0.001% to 6% Glycoses and Galactoses; (D) 2% to 8% by weight milk derived solids; (E) 0.2% to 2.5% by weight stabilizers and emulsifiers; and (F) at least one probiotic microorganism. The yogurt product may be refrigerated and served as a mousse, frozen dessert, or as a fermented yogurt drink similar to Ayran or Kefir. A method for producing the yogurt product is also disclosed herein.

9 Claims, No Drawings

US 11,766,050 B2

YOGURT FOR DOGS

CROSS-REFERENCE TO RELATED APPLICATION

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR

Not Applicable

BACKGROUND

Unless otherwise indicated herein, the materials described in this section are not prior art to the claims in this application and are not admitted to be prior art by inclusion in this section.

1. Field of the Invention

The present invention relates generally to yogurt. More specifically, the present invention relates to a yogurt product that may be consumed by dogs and mammalian pets.

2. Description of Related Art

Yogurt has many healthful benefits. It is usually high in calcium and protein, while containing active bacteria that may act as a probiotic, which is healthful for a person's digestive system. However, dogs and other mammalian pets are unable to obtain the benefits of yogurt, because the added sugars and artificial sweeteners are adverse to their digestive systems. Also, an artificial sweetener such as xylitol is toxic for dogs. In addition, dogs are not able to digest lactose after being weaned off their mothers' milk. As a result, if dogs consume lactose, they may experience gas, diarrhea, and vomiting. Therefore, there is a need for a nontoxic substance that is high in calcium and protein, which contains active bacteria to aid a dog's digestive system, which neither causes gas, diarrhea, nor vomiting.

BRIEF SUMMARY OF THE INVENTION

It is a principal object to solve at least one of the disadvantages with other attempted solutions or to create other utility by providing a yogurt product that may be consumed by dogs and other mammalian pets, such as cats, rabbits, ferrets, gerbils, rats, mice, guinea pigs, and hamsters. The yogurt is specially formulated as a lactose-free, no sugar added, low-fat dairy product with live and active culture probiotics, consisting essentially of calcium, protein, electrolytes, acidophilus, potassium, magnesium, a blend of low at milk, pectin, natural flavor, liquid *Lactobacillus acidophilus* fermentation product, liquid *Lactobacillus delbrueckii lactis* fermentation product, liquid *Bifidobacterium lactis* fermentation product, liquid *Lactobacillus rhamnosus* fermentation product, liquid *Lactobacillus casei* fermentation product, liquid *Lactobacillus bulgaricus* fermentation product, liquid *Bifidobacterium animalis lactis* fermentation product, and liquid *Streptococcus thermophilus* fermentation.

The yogurt product in unflavored form comprises (A) 0% to 88% by weight water; (B) 0.2% to 25% by weight of a no-fat protein component, selected from a group consisting of skim milk and cultured skim milk; (C1) 0.001% to 6% by weight of a sugar component comprising: (C1) 0.001% to 6% polydextrose and (C2) 0.001% to 6% Glycoses and Galactoses; (D) 2% to 8% by weight milk derived solids; (E) 0.2% to 2.5% by weight stabilizers and emulsifiers; and (F) at least one probiotic microorganism. The product of the present invention may be served as a mousse, frozen snack, or as a fermented yogurt drink similar to Ayran or Kefir.

A method for producing the product is also disclosed herein. Other objects and advantages of the present invention will become apparent from the following detailed description, which sets forth certain embodiments of the invention.

DETAILED DESCRIPTION OF THE INVENTION

It is to be understood that this invention is not limited to any particular embodiment described, which may vary. Also, it is to be understood that the terminology used herein is for the purpose of describing particular embodiments only, and is not intended to be limiting, since the scope of this invention will be limited only by the appended claims.

In the following detailed description, numerous specific details are set forth in order to explain and provide a thorough understanding of the present invention. However, it is apparent that the present invention may be practiced without all of these specific details.

The terminology used is to describe the particular embodiment shown and is not intended to limit the scope of the invention. The invention may also be embodied in many other forms in addition to the embodiments shown. Thus, the embodiments shown should not be construed as limiting, but rather, to allow a thorough and complete description of the disclosure that conveys the scope of the invention to a person having ordinary skill in the art in the field of this invention. Therefore, for the terms used herein, the singular forms "the," "a," and "an" are intended to include the plural forms as well as the singular forms, unless the context clearly indicates otherwise. The term "and" includes any and all combinations of one or more of the associated listed items. As used herein, the terms "comprising" and "comprises" when used in this specification, identify specific steps, integers, operations, features, components, and elements, but do not preclude the presence or addition of one or more other steps, operations, features, components, and elements. In addition, the features, components, and elements referenced may be exaggerated for clarity.

Unless otherwise defined, all scientific terms, technical terms, or other terms used herein have the same meaning as the term that is understood by one having ordinary skill in the art in the field of this invention. It is also understood that these terms, including their dictionary meaning, should be understood as having the meaning, which is consistent with their definitions in the related relevant art. In addition, the present disclosure is not to be interpreted in an idealized or overly formal sense unless expressly stated so herein. Constructions or functions that are well known in the art may not be fully described in detail for brevity.

In describing the invention, it is understood that a number of steps and methods may be disclosed. Each of these may have individual benefit. Also, each may be used in conjunction with at least one or more of the disclosed steps and methods. Therefore, this description will refrain from stating each and every possible combination of the individual steps and methods for the sake of brevity. Regardless, the specification and related claims should be understood with the combinations that are entirely within the scope of the claims and inventions.

The disclosure in this invention are examples of how it may be implemented and are not intended to limit the scope of the invention to the specific embodiments or the description provided herein. The present invention will now be described by example in the following paragraphs, which represent embodiments and alternative embodiments.

The detailed embodiments of the present invention are disclosed herein. It should be understood; however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

The present invention is a yogurt for dogs and other mammalian pets. The yogurt of the present invention is suitable for dogs to consume daily. The yogurt is lactose-free and has no added sugar. The yogurt helps dogs build a healthier digestive and immune system. The yogurt has 17 billion colony forming units (CFUs) of probiotics per 6-ounce container. A single serving of the yogurt encourages absorption of the healthy bacteria. The yogurt has a pleasant taste, which encourages dogs to eat it. The yogurt of the present invention provides dogs with a daily dose of healthy dairy.

Probiotics are important for good stomach health for dogs. They help a dog build a healthier digestive system by encouraging the absorption of so-called "good" bacteria and fighting the bad. However, dogs do not prefer the taste of a probiotic pill. On the other hand, dogs do prefer the taste of yogurt. Thus, it is an object of the present invention to remedy this problem and provide a yogurt that has a taste that is preferred by dogs, may safely be consumed by dogs, and possesses other advantageous ingredients.

The yogurt of the present invention provides more and a higher quality probiotic to a dog's diet. There may be eight or more live and active culture probiotics found in the yogurt of the present invention, which is nearly twice as many of those found in human yogurt. The yogurt of the present invention may contain live and active culture probiotics that boost a dog's digestive system faster and better than pills or powders, which are scientifically passive and require water and time to become active.

The yogurt product of the present invention may have one or more live and active-culture probiotics in each container. Probiotics are microorganisms that maintain and restore beneficial bacteria to the digestive tract for a long and healthy life. Probiotics are found in the yogurt of the present invention. The yogurt may also contain calcium, protein, electrolytes, acidophilus, potassium, and magnesium.

The yogurt product of the present invention may aid digestion, improve gut health, strengthen the immune system, promote better bone health, increase energy levels, sooth stomachs for sick dogs, allow for immediate absorption of bad bacteria-fighting cultures, promote more efficient fiber processing, improve absorption of vitamins and minerals, reduces gas-passing, relieves diarrhea and constipation, and reduces food intolerance.

The yogurt product of the present invention in unflavored form comprises (A) 0% to 88% by weight water; (B) 0.2% to 25% by weight of a no-fat protein component, selected from a group consisting of skim milk and cultured skim milk; (C1) 0.001% to 6% by weight of a sugar component comprising: (C1) 0.001% to 6% polydextrose and (C2) 0.001% to 6% Glycoses and Galactoses; (D) 2% to 8% by weight milk derived solids; (E) 0.2% to 2.5% by weight stabilizers and emulsifiers; and (F) at least one probiotic microorganism.

The yogurt product of the present invention may be served as a mousse, frozen snack, or as a fermented yogurt drink similar to Ayran or Kefir. The yogurt product of the present invention further relates to a method for the production of yogurt where the product may be refrigerated or frozen and served as a mousse, dessert, snack, or drink. A method for producing the yogurt product of the present invention is also disclosed herein.

The summary method of preparing the direct vat system of making yogurt is described as follows. The procedure may be either "cup set," where the yogurt is fermented in the cup, or "vat set," where the yogurt is fermented in kettles and then pumped or transferred to the cups. The detailed method of preparing yogurt using the direct vat system is described as follows:

(a) Adjust the dry matter content, which may comprise protein, fat, etc., and add the dry matter content and the wet ingredients related to the yogurt formula to the milk to pre-treat it. This involves mixing together all of the dry and wet ingredients into a milk slurry.

(b) The milk slurry is then heated in a commercial sanitary kettle to about 65° C. (149° F.).

(c) The milk slurry is then homogenized at a temperature between 60-75° C. (140-167° F.) and at a pressure ranging from 190 bar to 210 bar (19-21 MPa or 2756-3046 psi) until the fat droplets are emulsified and the cream does not separate.

(d) The milk slurry is then pasteurized until it is partially sterilized.

(e) The milk slurry is then passed through a small orifice, so that the shearing effect reduces the diameter of the fat globule to less than 2 μm to prevent larger fat globules.

(f) The milk slurry is then heat-treated to between 85° C. (185° F.) and 90° C. (194° F.) for 10 to 30 minutes, where the time is measured from the time the milk reaches the required temperature for the heat treatment.

(g) Allow the mix to cool to a fermentation temperature, which is usually between 43-46° C. (109-115° F.), while stirring slowly.

(h) While stirring slowly, add lactase enzymes to hydrolyze lactose into glucose and galactose. The lactase enzymes break the disaccharides into monosaccharides.

(i) While stirring slowly, adding at least eight (8) probiotic cultures, comprising *Lactobacillus acidophilus, Lactobacillus delbrueckii lactis, Bifidobacterium lactis, Lactobacillus rhamnosus, Lactobacillus casei, Lactobacillus bulgaricus, Bifidobacterium animalis lactis*, and *Streptococcus thermophilus*. Also, one or more additional probiotic microorganism may added from a group consisting of *Bifidobacterium*

*infantis, Bifidobacterium breve, Bifidobacterium bifidum, Bifidobacterium longum, Lactobacillus plantarum, Lactobacillus reuteri, Lactobacillus brevis, Lactobacillus gasseri, Lactobacillus paracasei, Lactobacillus salivarius, Leuconostoc cremoris, Streptococcus Florentinus,* and *Streptococcus Diacetylactis.*

(j) Add the recommended amount of culture (0.02%) to the batch of tempered milk.

(k) Pour the inoculated yogurt mix into yogurt-size cups, leaving a minimum amount of headspace.

(l) Apply the code date and lot numbers.

(m) Incubate the yogurt mix at the required temperature of about 43° C. (109° F.) for about 4-6 hours until the pH is reduced from around 6.4-6.9 to about 4.4 to 4.8.

(n) Remove the milk slurry, which is also referred to as a "yogurt mix," from the heat source.

(o) Allow the milk slurry to cool until the pH of the final product is between 3.8 and 4.4.

(p) Place the cups in a refrigerator at 4° C. (39° F.) to rapidly cool them.

(q) When the cups reach a temperature of about 4° C. (39° F.) place them in a proper shipping case.

(r) Apply the pallet pattern, and (s) Add labeling and pallet wrapping.

The above-described process converts the lactose in the milk slurry into lactic acid to create a lactose-free yogurt product that is safe for dogs to consume through three major steps: (1) controlling the medium temperature, (2) adding lactic acid bacteria that eat the lactose and convert it into lactic acid, and (3) introducing enzymes to a lactose containing medium, such as milk in this case at the stated quantities and temperatures. The lactose will break down into subcomponents, where these subcomponents are not lactose. The lactic acid bacteria and other organic acids used in the above process transforms the milk slurry into a yogurt with a tangy flavor.

Mixing the multiple species of active bacteria together result in different properties than any of the individual bacteria alone, because each live and active bacteria creates different metabolic breakdown that changes the texture of the yogurt in a different way and introduces some specific health benefits. Mixing the multiple active bacteria together in the above process acts synergistically to ferment the milk at a faster speed than any individual bacteria can ferment by itself, because each type of bacteria strains works in a different pH level and creates different components with different features.

The above described process produces a resultant yogurt that has other beneficial properties other than being lactose-free in that it contains live and active probiotic cultures. This allows the cultures of the yogurt of this invention to pass through the low pH stomach gastric solution, since they are bile acid resistant. Thus, the yogurt of this invention allows these cultures to pass through the upper digestive system and establish colonies in the small intestine of the dogs. These colonies provide many health and wellness benefits, including restoration of normal intestinal bacterial flora, suppression of microbial pathogens, the ability to fix or improve intestinal barrier, the promotion of the synthesis of antioxidants and the antimicrobial activity against possible pathogens, the ability to reduce pathogen adherence to epithelial cells surfaces in dog's small intestines, and to possibly stop or prevent inflammatory bowel disease and "leaky gut."

The mixture of the multiple active bacteria and milk in the product of the above described invention has different functional characteristics than the naturally occurring bacteria and milk by itself in that the selected targeted bacteria groups each have specific targeted goals such as improvement of texture by creating extra cellular polysaccharides and creation of enzymes help to further break down the carbohydrates, proteins, and lipids in the small intestine of dogs, while providing very beneficial fatty acids and peptides.

What is claimed is:

1. A yogurt product for a mammalian pet, comprising:
   (A) water;
   (B) milk-derived solids;
   (C) stabilizers and emulsifiers; and
   (D) live and active cultures of at least the following probiotic microorganisms: *Lactobacillus acidophilus, Lactobacillus delbrueckii lactis, Bifidobacterium lactis, Lactobacillus rhamnosus, Lactobacillus casei, Lactobacillus bulgaricus, Bifidobacterium animalis lactis,* and *Streptococcus thermophilus;*
   wherein the probiotic microorganisms form the yogurt product and the yogurt product is a mammalian pet food.

2. The yogurt product according to claim 1, wherein the yogurt product comprises at least one additional live and active culture of a probiotic microorganism selected from the group consisting of *Bifidobacterium infantis, Bifidobacterium breve, Bifidobacterium bifidum, Bifidobactertum longum, Lactobacillus plantarum, Lactobacillus reuteri, Lactobacillus brevis, Lactobacillus gasseri, Lactobacillus paracasei, Lactobacillus salivarius, Lactococcus lactis, Leuconostoc cremoris, Streptococcus florentinus,* and *Streptococcus diacetylactis.*

3. The yogurt product according to claim 1, wherein the product is refrigerated or frozen, and served as a mousse dessert, snack, meal, or drink.

4. The yogurt product according to claim 1, wherein the mammalian pet is selected from the group consisting of dogs, cats, and rabbits.

5. The yogurt product according to claim 4, wherein the mammalian pet is selected from the group consisting of cats and rabbits.

6. The yogurt product according to claim 1, wherein the yogurt product is lactose-free.

7. The yogurt product according to claim 1, wherein the yogurt product has no added sugar.

8. The yogurt product according to claim 1, wherein the yogurt product is fat-free.

9. The yogurt product according to claim 1, wherein the yogurt product includes no artificial sweeteners.

\* \* \* \* \*